United States Patent
Huang et al.

(10) Patent No.: US 11,889,568 B2
(45) Date of Patent: Jan. 30, 2024

(54) SYSTEMS AND METHODS FOR PAGING OVER WIFI FOR MOBILE TERMINATING CALLS

(71) Applicant: Verizon Patent and Licensing Inc., Basking Ridge, NJ (US)

(72) Inventors: Chien-Yuan Huang, Basking Ridge, NJ (US); Suzann Hua, Beverly Hills, CA (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/934,352

(22) Filed: Sep. 22, 2022

(65) Prior Publication Data

US 2023/0020413 A1    Jan. 19, 2023

Related U.S. Application Data (63) Continuation of application No. 17/115,411, filed on Dec. 8, 2020, now Pat. No. 11,477,829.

(51) Int. Cl.

| | |
|---|---|
| *H04W 76/12* | (2018.01) |
| *H04W 76/32* | (2018.01) |
| *H04W 76/19* | (2018.01) |
| *H04L 9/40* | (2022.01) |
| *H04W 12/00* | (2021.01) |
| *H04W 68/00* | (2009.01) |
| *H04W 84/12* | (2009.01) |

(52) U.S. Cl.
CPC ........... *H04W 76/12* (2018.02); *H04L 63/029* (2013.01); *H04L 63/164* (2013.01); *H04W 12/009* (2019.01); *H04W 68/005* (2013.01); *H04W 76/19* (2018.02); *H04W 76/32* (2018.02); *H04W 84/12* (2013.01)

(58) Field of Classification Search
CPC ..... H04W 76/19; H04W 24/10; H04W 52/34; H04W 72/04; H04W 72/08; H04W 74/004; H04W 74/0833; H04W 74/0891; H04W 68/02; H04W 76/28; H04W 24/08; H04W 74/0816; H04L 5/00; H04B 7/0452

See application file for complete search history.

(56) References Cited

U.S. PATENT DOCUMENTS

| | | | |
|---|---|---|---|
| 2020/0036679 A1* | 1/2020 | Chand | ............... H04L 47/28 |
| 2021/0152518 A1* | 5/2021 | Pawar | .............. H04L 63/029 |
| 2021/0306247 A1* | 9/2021 | Duan | ............... H04L 43/10 |

* cited by examiner

*Primary Examiner* — Iqbal Zaidi (57) ABSTRACT

A device may include a processor configured to detect that an Internet Protocol Security (IPsec) tunnel from a user equipment (UE) device connected via a WiFi connection has become idle, based on the IPsec tunnel meeting an idleness criterion, and instruct the UE device to tear down the IPsec tunnel, in response to detecting that the IPsec tunnel from the UE device connected via the WiFi connection meets the idleness criterion. The device may be further configured to receive a mobile terminating call for the UE device; establish a new IPsec tunnel to the UE device via the WiFi connection, in response to receiving the mobile terminating call for the UE device; and forward the received mobile terminating call to the UE device via the established new IPsec tunnel.

20 Claims, 9 Drawing Sheets

SYSTEMS AND METHODS FOR PAGING OVER WIFI FOR MOBILE TERMINATING CALLS

CROSS-REFERENCE TO RELATED APPLICATIONS

This patent application is a continuation of U.S. patent application Ser. No. 17/115,411, filed on Dec. 8, 2020, and titled "SYSTEMS AND METHODS FOR PAGING OVER WIFI FOR MOBILE TERMINATING CALLS," the disclosure of which is hereby incorporated by reference in its entirety.

BACKGROUND INFORMATION satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of user devices that use different types of services and experience various conditions. Managing all various types of network connections under different conditions poses various challenges.

DETAILED DESCRIPTION OF PREFERRED EMBODIMENTS

The following detailed description refers to the accompanying drawings. The same reference numbers in different drawings identify the same or similar elements.

Users of mobile wireless communication services may use various wireless technologies to connect to a network and/or communicate with other users. For example, a user equipment (UE) device may be configured to communicate with a Radio Access Network (RAN) via a base station using cellular wireless signals based on the Fourth Generation (4G) Long Term Evolution (LTE) air interface, the Fifth Generation (5G) New Radio (NR) air interface, and/or another type of cellular wireless signals. Furthermore, the UE device may be configured to use short-range wireless signals when within the communication range of a wireless local area network (WLAN).

A WiFi network, which is one type of WLAN, is based on the Institute of Electrical and Electronics Engineers (IEEE) 802.11 family of standards. A UE device may connect to a WiFi transceiver, referred to as a WiFi Access Point (AP), when the UE device is within the communication range of the WiFi AP and is authorized to access the WiFi network associated with the WiFi AP. For example, when a UE device enters the communication range of the WiFi AP, the UE device may connect to the WiFi AP and may prioritize communicating via the WiFi AP, rather than via a base station.

WiFi connections are increasingly used for voice communication. In order for a UE device to receive a mobile terminating call (e.g., a call in which the UE device is the called party), the UE device may need to maintain an Internet Protocol (IP) security (IPsec) tunnel via the WiFi AP to the core network of the provider of cellular wireless communication services for which the UE device is a subscriber. The core network may then use the IPsec tunnel to connect the mobile terminating call to the UE device. When the UE device is in idle mode, the core network needs to maintain an idle IPsec tunnel to the UE device via the WiFi AP so that the UE device may receive incoming calls. Maintaining a large number of idle IPsec tunnels wastes network resources by reducing bandwidth capacity and processing capacity of network devices.

Implementations described herein relate to systems and methods for paging over WiFi for mobile terminating Voice-over-IP (VoIP) calls. A network device may be configured to tear down an idle IPsec tunnel over WiFi to a UE device. Subsequently, if a mobile terminating call to the UE device is received, the network device may page the UE device, using location update information received from the UE device, to establish a new IPsec tunnel. The network device may include, for example, a Non-Third-Generation-Partnership-Project Interworking Function (N3IWF) that interfaces a Third Generation Partnership Project (3GPP) core network to a non-3GPP network, such as a WiFi network.

For example, an N3IWF device in a core network may establish an IPsec tunnel from a UE device via a WiFi connection, may receive location update information from the UE device via the established IPsec tunnel, and may provide received location update information to a function that maintains subscriber information in the core network, such as, for example, a Unified Data Management (UDM) function. The location update information may include a UE device identifier (ID) associated with the UE device; a Globally Unique Access and Mobility Function Identifier (GUAMI) associated with the UE device; an N3IWF identifier associated with the UE device; a WiFi AP Media Access Control (MAC) address associated with the WiFi connection; a service set identifier (SSID) associated with the WiFi connection; and/or other types of location update information. In some implementations, the N3IWF device may then receive an instruction from the UDM function to tear down the IPsec tunnel if the IPsec tunnel becomes idle. In other implementations, the N3IWF may be configured to automatically tear down the IPsec tunnel if the IPsec tunnel becomes idle.

The N3IWF may detect that the IPsec tunnel has become idle, based on the IPsec tunnel meeting an idleness criterion, and may, in response, instruct the UE device to tear down the IPsec tunnel. At a later time, the N3IWF device may receive a mobile terminating call for the UE device and may, in response, establish a new IPsec tunnel to the UE device via the WiFi connection and forward the received mobile terminating call to the UE device via the established new IPsec tunnel. For example, the N3IWF device may page the UE device using location update information obtained from the UDM function and may instruct the UE device to establish the new IPsec tunnel. In some implementations, if paging the UE device via the WiFi connection is not successful, the N3IWF may inform another component of the core network (e.g., an Access and Mobility Function (AMF)) and the core network may page the UE device using a cellular connection via a base station to which the UE device is attached. In other implementations, the core network may page the UE device via both the WiFi connection and the cellular wireless connection. If paging the UE device is not successful (e.g., the UE device does not respond by establishing an IPsec tunnel), the mobile terminating call may be forwarded to voicemail.

Figure 1:
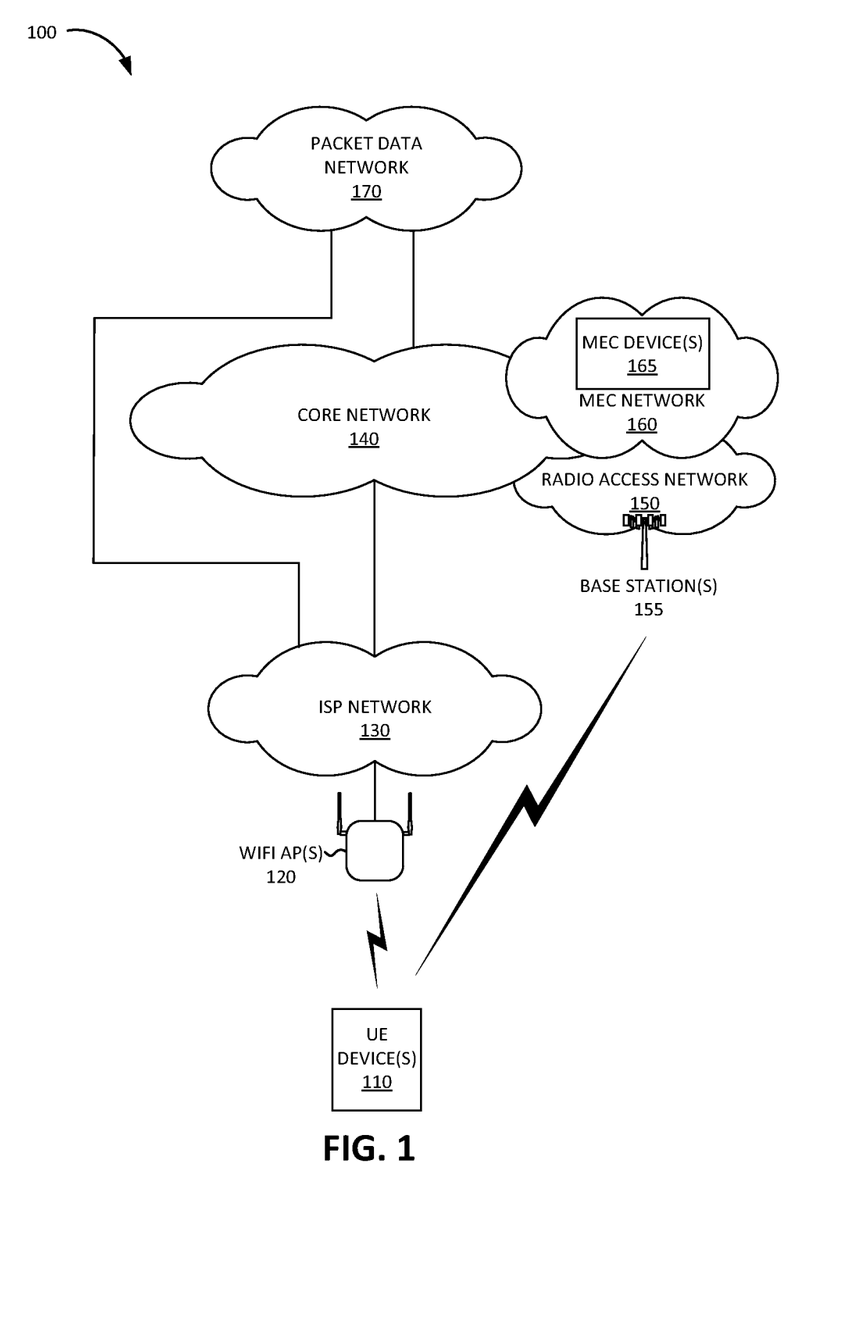
FIG. 1 illustrates an environment according to an implementation described herein.

FIG. 1 is a diagram of an exemplary environment 100 in which the systems and/or methods, described herein, may be implemented. As shown in FIG. 1, environment 100 may include UE device(s) 110, WiFi Access Point(s) (AP(s)) 120, an Internet Service Provider Network 130, a core network 140, a radio access network (RAN) 150, base station(s) 155, a Multi-Access Edge Computing (MEC) network 160, MEC device(s) 165, and packet data network(s) (PDN(s)) 170.

UE device(s) 110 may include any device with cellular wireless communication functionality and WiFi communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

WiFi AP(s) 120 may include a device with a transceiver configured to communicate with client devices 140 using WiFi signals based on the IEEE 802.11 standards for implementing a WLAN network. WiFi AP 120 may be connected to a switch and/or router (not shown in FIG. 1) for devices in a customer premises network and may connect devices in the customer premises network to an Internet Service Provider (ISP) network via a wired connection, such as an Ethernet cable, or an optical network terminal (ONT) connected to an optical fiber. ISP network 130 may include a Layer 2 and/or Layer 3 network associated with an ISP. ISP network 130 may enable UE device 110 to communicate with other networks, such as core network 140 and/or PDN network 170.

Core network 140 may be managed by a provider of cellular wireless communication services and may manage communication sessions of subscribers connecting to core network 140 via WiFi AP 120 and/or via RAN 150. For example, core network 160 may establish an Internet Protocol (IP) connection between UE devices 110 and PDN 170. Core network 140 may include a 5G core network. Exemplary components of core network 140 are described below with reference to FIG. 2.

RAN 150 may include one or more base stations 155. Each base station 155 may include devices and/or components configured to enable cellular wireless communication with UE devices 110. For example, base station 155 may include a 5G NR base station (e.g., a gNodeB) and/or a 4G LTE base station (e.g., an eNodeB). Core network 140 may facilitate handovers between base stations 155 and between base stations 155 and WiFi Aps 120. For example, if UE device 110 leaves the communication range of WiFi AP 120, a connection to UE device 110 via WiFi AP 120 may be handed over to base station 155, and if UE device 110 enters the communication range of WiFi AP 120, a connection to UE device 110 via base station 15 may be handed over to WiFi AP 120.

MEC network 160 may provide MEC services for UE devices 110 attached to core network 140 via WiFi AP 120 and/or via RAN 180. MEC network 160 may interface with RAN 150 and/or with core network 140 via a MEC gateway device (not shown in FIG. 1). MEC network 160 may include MEC device(s) 165. MEC device(s) 165 may provide MEC services, such as a service associated with a particular application, such as a content delivery system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, implementation of a virtual network function (VNF), and/or another type of network service. As yet another example, a MEC service may include control of IoT devices, such as hosting an application server for autonomous vehicles, a security system, a manufacturing and/or robotics system, and/or another type of IoT system. Furthermore, MEC device(s) 165 may implement/host one or more functions of core network 140.

PDN(s) 170 may each include a packet data network. PDN 170 may be associated with an Access Point Name (APN) and a UE device may request a connection to the particular packet data network 190 using the APN. PDN 170 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. For example, PDN 170 may include an IP Multimedia Subsystem (IMS) that manages voice communication between UE devices 110 and/or between UE devices 110 and other voice communication devices.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
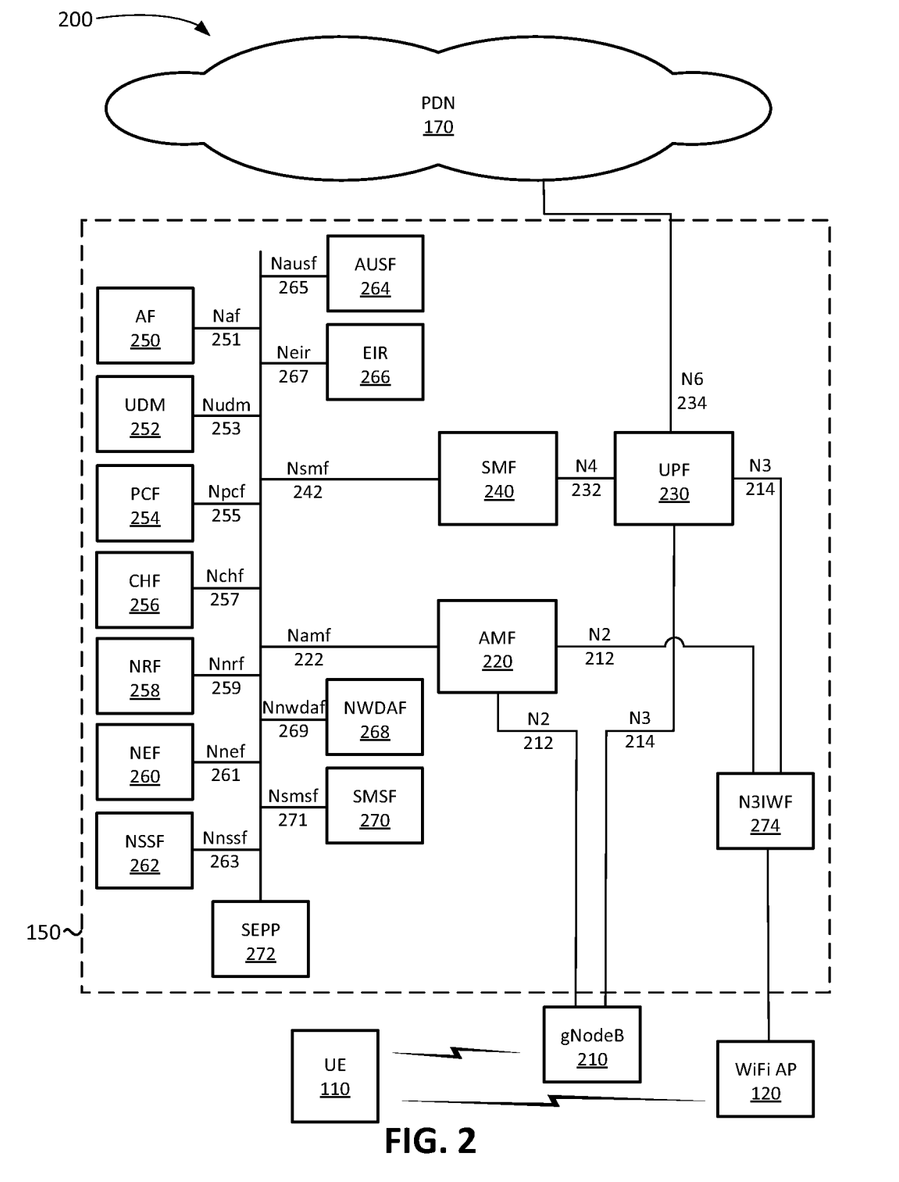
FIG. 2 illustrates exemplary components of the core network of FIG. 1 according to an implementation described herein.

FIG. 2 illustrates an implementation 200 of core network 140 as a 5G core network. As shown in FIG. 2, implementation 200 includes UE device 110, gNodeB 210, core network 140, and PDN 170. Core network 140 may include an AMF 220, a User Plane Function (UPF) 230, a Session Management Function (SMF) 240, an Application Function (AF) 250, a UDM 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and an N3IWF 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 201 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274. gNodeB 210 may be part of RAN 120 and may include base station 125. Exemplary components of gNodeB 210 are describe below with reference to FIG. 2.

The components of core network 140 may be implemented as dedicated hardware components, Virtual Network Functions (VNFs), and/or container-based Cloud Native Functions (CNFs), implemented on top of a common shared physical infrastructure using Software Defined Networking (SDN). For example, an SDN controller may implement one or more of the components of core network 140 using an adapter implementing a VNF virtual machine, a CNF container, an event driven serverless architecture interface, and/or another type of SDN architecture. The common shared physical infrastructure may be implemented using one or more devices 300 described below with reference to FIG. 3 in a cloud computing center associated with core network 140. Additionally, or alternatively, some, or all, of the common shared physical infrastructure may be implemented using one or more devices 300 included in MEC device 165.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222. AMF 220 may communicate with gNodeB 210 and/or with N3IWF 274 via an N2 interface 212.

UPF 230 may maintain an anchor point for intra/inter-RAT mobility, maintain an external Packet Data Unit (PDU) point of interconnect to a particular PDN 170, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with gNodeB 210 using an N3 interface 214, communicate with SMF 240 using an N4 interface 232, and connect to PDN 170 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of Non-Access Stratum messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface.

UDM 252 may maintain subscription information for UE devices 110, manage subscriptions, generate authentication credentials, handle user identification, perform access authorization based on subscription data, maintain service and/or session continuity by maintaining assignment of SMF 240 for ongoing sessions, support SMS delivery, support lawful intercept functionality, and/or perform other processes associated with managing user data. UDM 252 may store, in a subscription profile associated with a particular UE device 110, location update information that includes information identifying an AMF associated with the particular UE device

110 and/or information identifying a WiFi network associated with the particular UE device 110. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 140. CHF 256 may be accessible via Nchf interface 257.

NRF 258 may support a service discovery function and maintain profiles of available network function (NF) instances and their supported services. An NF profile may include an NF instance ID, an NF type, a Public Land Mobile Network (PLMN) ID(s) associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose services, capabilities, and/or events to other NFs, including third party NFs, AFs, edge computing NFs, and/or other types of NFs. Furthermore, NEF 260 may secure provisioning of information from external applications to core network 140, translate information between core network 140 and devices/networks external to core network 140, support a Packet Flow Description (PFD) function, and/or perform other types of network exposure functions.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may provide a list of allowed slices for a particular UE device 110 to UDM 252 to store in a subscription profile associated with the particular UE device 110. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to determine if a PEI has been blacklisted. EIR 266 may be accessible via Neir interface 267. NWDAF 268 may collect analytics information associated with radio access network 130 and/or core network 140. SMSF 270 may perform SMS services for UE devices 110. SMSF 270 may be accessible via Nsmsf interface 271. SEPP 272 may implement application layer security for all layer information exchanged between two NFs across two different Public Land Mobile Networks.

N3IWF 274 may interconnect to a non-3GPP access device, such as, for example, a WiFi access point (not shown in FIG. 2). N3IWF 274 may facilitate handovers for UE device 110 between radio access network 130 and the non-3GPP access device. N3IWF 274 communicate with UPF 230 using N3 interface 214. N3IWF 274 may manage an IPsec tunnel to UE device 110 via WiFi AP 120. If the IPsec tunnel becomes idle, N3IWF 274 may instruct UE device 110 to tear down the IPsec tunnel. If a mobile terminating call is received for UE device 110, M3IWF 274 may page UE device 110 via WiFi AP 120 to establish a new IPsec tunnel.

Although FIG. 2 shows exemplary components of core network 140, in other implementations, core network 140 may include fewer components, different components, differently arranged components, or additional components than depicted in FIG. 2. Additionally, or alternatively, one or more components of core network 140 may perform functions described as being performed by one or more other components of core network 140. For example, core network 140 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 140 may include a reference point architecture that includes point-to-point interfaces between particular function nodes.

Figure 3:
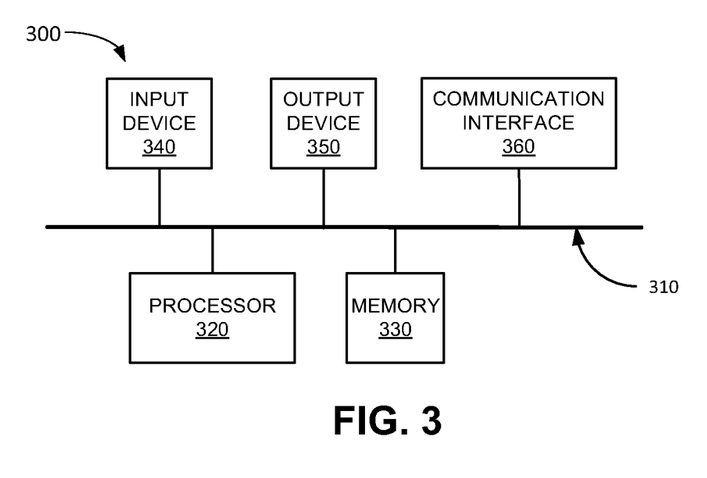
FIG. 3 illustrates exemplary components of a device that may be included in a component of FIG. 1 or FIG. 2 according to an implementation described herein.

FIG. 3 is a diagram illustrating example components of a device 300 according to an implementation described herein. UE device 110, WiFi AP 120, base station 155, MEC device 165, and/or any of the components of FIG. 2 may each include, or be implemented on, one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), neural processing unit (NPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to the management of IPsec tunnels via WiFi connections. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
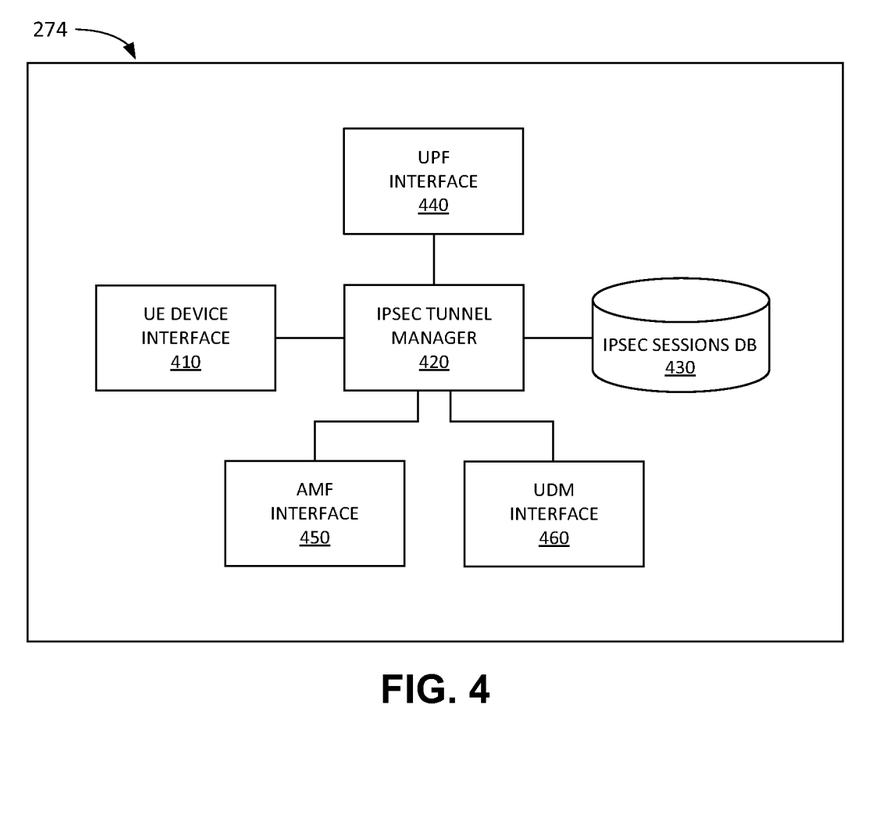
FIG. 4 illustrates exemplary components of the Non-Third-Generation-Partnership-Project Interworking Function (N3IWF) of FIG. 2 according to an implementation described herein.

FIG. 4 is a diagram illustrating exemplary components of N3IWF 274. The components of N3IWF 274 may be implemented, for example, via processor 320 executing instructions from memory 330. Alternatively, some or all of the components of N3IWF 274 may be implemented via hard-wired circuitry.

As shown in FIG. 4, N3IWF 274 may include a UE device interface 410, an IPsec tunnel manager 420, an IPsec sessions database (DB) 430, a UPF interface 440, an AMF interface 450, and a UDM interface 460. UE device interface 410 may be configured to communicate with UE device 110 via WiFi AP 120. For example, UE device interface 410 may establish an IPsec tunnel with UE device 110 via WiFi AP 120. An IPsec tunnel may be established using Internet Key Exchange (IKE) authentication and encryption. For example, an IKE phase 1 tunnel may be established using Internet Security Association and Key Management Protocol (ISAKMP) and used for management traffic. The IKE phase 1 tunnel may then be used to establish an IKE phase 2 tunnel used for data exchange and for exchanging keep alive messages.

IPsec tunnel manager 420 may manage IPsec tunnels associated with WiFi APs 120 and store information relating to IPsec tunnels associated with UE devices 110 in IPsec sessions DB 430. For example, for each IPsec tunnel, IPsec sessions DB 430 may store information identifying UE device 110 associated with the IPsec tunnel, information identifying WiFi AP 120 associated with the IPsec tunnel, and/or information identifying a status associated with IPsec tunnel, such as whether the IPsec tunnel has become idle based on the IPsec tunnel meeting an idleness criterion, a length of time since the IPsec tunnel has become idle, whether UE device 110 has been instructed to tear down the IPsec tunnel after the IPsec tunnel has become idle, and/or other types of status information associated with the IPsec tunnel.

IPsec tunnel manager 420 may monitor each IPsec tunnel to determine whether the IPsec tunnel has become idle based on the IPsec tunnel meeting an idleness criterion. The idleness criterion may be met if the quantity of data sent or received via the IPsec tunnel is below a data quantity threshold within a particular time period. As an example, IPsec tunnel manager 420 may ignore keep-alive packets sent via the IPsec tunnel in determining whether the IPsec tunnel has become idle. As another example, IPsec tunnel manager 420 may analyze packets sent and/or received via the IPsec tunnel to determine whether a total number of bytes of data sent and/or received via the IPsec tunnel within a time period less than a particular number of bytes and may designate the IPsec tunnel as idle if the number of bytes sent and/or received via the IPsec tunnel is less than the particular number of bytes. If IPsec tunnel manager 420 detects that an IPsec tunnel has gone idle, IPsec manager 420 may instruct the UE device 110 associated with the IPsec tunnel to tear down the IPsec tunnel. Furthermore, if IPsec tunnel manager 420 detects a mobile terminating call for UE device 110 and determines that the IPsec tunnel to UE device 110 has been deactivated or torn down, IPsec tunnel manager 420 may page UE device 110 to establish a new IPsec tunnel with N3IWF 274.

UPF interface 440 may be configured to communicate with UPF 230. Data traffic to and from UE device 110 to PDN 170 may be sent to and from UPF 230 via UPF interface 440. AMF interface 450 may be configured to communicate with AMF 200. For example, AMF 220 may send instructions to N3IWF 274 to set up particular communication sessions via AMF interface 450. UDM interface 460 may be configured to communicate with UDM 252. For example, N3IWF 274 may provide location update information to UDM 252 via UDM interface 460. Furthermore, in some implementations, N3IWF 274 may receive instructions from UDM 252 to tear down an IPsec tunnel if the IPsec tunnel becomes idle.

Although FIG. 4 shows exemplary components of N3IWF 274, in other implementations, N3IWF 274 may include fewer components, different components, differently arranged components, or additional components than depicted in FIG. 4. Additionally, or alternatively, one or more components of N3IWF 274 may perform functions described as being performed by one or more other components of N3IWF 274.

Figure 5:
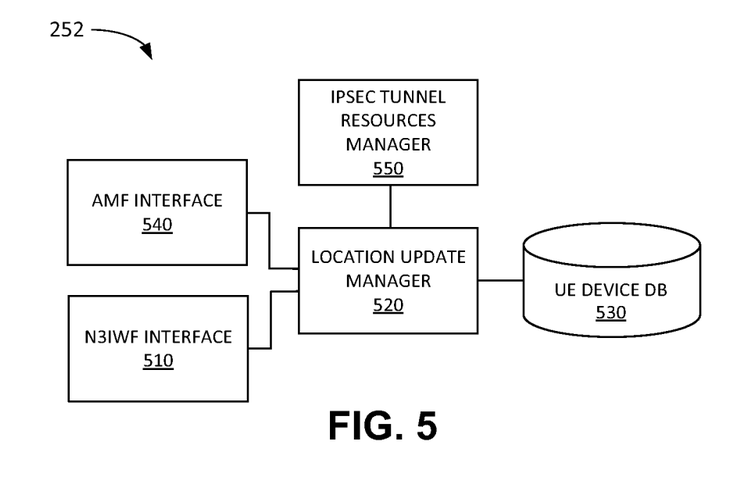
FIG. 5 illustrates exemplary components of the Unified Data Management (UDM) function of FIG. 2 according to an implementation described herein.

FIG. 5 is a diagram illustrating exemplary components of UDM 252. The components of UDM 252 may be implemented, for example, via processor 320 executing instructions from memory 330. Alternatively, some or all of the components of UDM 252 may be implemented via hardwired circuitry. As shown in FIG. 5, UDM 252 may include an N3IWF interface 510, a location update manager 520, a UE device DB 530, an AMF interface 540, and an IPsec tunnel resources manager 550.

N3IWF interface 510 may be configured to communicate with N3IWF 274. For example, UDM 252 may receive location update information from N3IWF 274 via N3IWF interface 510. Moreover, in some implementations, UDM 252 may send an instruction to N3IWF 274 via N3IWF interface 510 to tear down or deactivate an IPsec tunnel if the IPsec tunnel becomes idle. Location update manager 520 may manage location update information for UE devices 110. For example, location update manager 520 may store location update information in UE device DB 530 and/or provide location update information to AMF 220 from UE device DB 530 upon request. Exemplary information that may be stored in UE device DB 530 is described below with reference to FIG. 6.

AMF interface 540 may be configured to communicate with AMF 220. For example, AMF 220 may request location update information for UE device 110 via AMF interface 540 and UDM 252 may provide the requested location update information to AMF 220 via AMF interface 540. IPsec tunnel resources manager 550 may manage IPsec tunnel resources associated with core network 140. For example, IPsec tunnel resources manager 550 may manage a policy for management of IPsec tunnel resources, such as, for example, instructing other NFs, such as N3IWF 274, to tear down an IPsec tunnel associated with UE device 110 if the IPsec tunnel has become idle.

Although FIG. 5 shows exemplary components of UDM 252, in other implementations, UDM 252 may include fewer components, different components, differently arranged components, or additional components than depicted in FIG. 5. Additionally, or alternatively, one or more components of UDM 252 may perform functions described as being performed by one or more other components of UDM 252.

Figure 6:
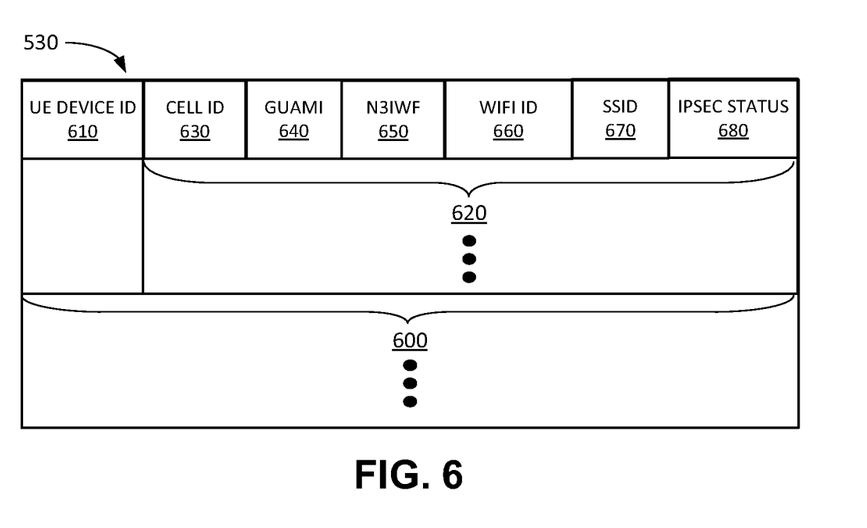
FIG. 6 illustrates exemplary components of the user equipment (UE) device database of FIG. 5 according to an implementation described herein.

FIG. 6 is a diagram illustrating exemplary information stored in UE device DB 530. As shown in FIG. 6, UE device DB 530 may include one or more UE device records 600. Each UE device record 600 may store information relating to a UE device 110. UE device record 600 may include a UE device ID field 610 and one or more location update records 620. UE device ID field 610 may store one or more IDs associated with UE device 110, such as, for example, a Mobile Directory Number (MDN), an International Mobile Subscriber Identity (IMSI), a Mobile Station International Subscriber Directory Number (MSISDN), an International Mobile Equipment Identity (IMEI), an IP address, a Media Access Control (MAC) address, and/or another type of identifier associated with UE device 110. Each location update record 620 may store information relating to a location update received from UE device 110. For example, location update records 620 for UE device 110 may be stored in a chronological order.

Location update record 620 may include a cell ID field 610, a GUAMI field 640, an N3IWF field 650, a WiFi ID field 660, an SSID field 670, and an IPsec status field 680.

Cell ID field 610 may store an ID associated with the cell of base station 150 to which UE device 110 is attached. GUAMI field 640 may store a GUAMI for AMF 220 associated with UE device 110. N3IWF ID field 650 may store an N3IWF ID for N3IWF 274 associated with UE device 110. WiFi ID field 660 may store a WiFi ID for WiFi AP 120 associated with UE device 110, such as, for example, a MAC address of WiFi AP 120, a basic service set ID (BSSID) of WiFi AP 120, and/or another type of ID associated with WiFi AP 120. SSID field 670 may store an SSID for the WiFi network associated with UE device 110.

IPsec status field 680 may store information relating to the status of an IPsec tunnel associated with UE device 110. For example, IPsec status field 680 may store information indicating whether an IPsec tunnel has been established from UE device 110 to N3IWF 274 via WiFi AP 120, whether an instruction has been provided to N3IWF 274 to tear down the IPsec tunnel if the IPsec tunnel becomes idle, whether the IPsec tunnel has become idle, whether the IPsec tunnel has been torn down in response to becoming idle, and/or other information associated with the status of the IPsec tunnel.

Although FIG. 6 shows exemplary components of UE device DB 530, in other implementations, UE device DB 530 may include fewer components, different components, additional components, or differently arranged components than depicted in FIG. 6.

Figure 7:
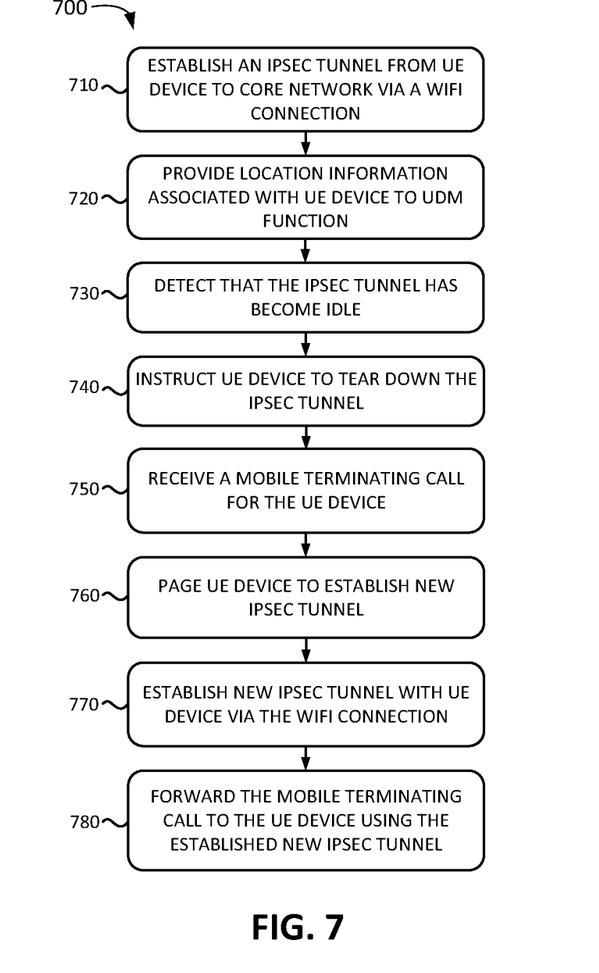
FIG. 7 illustrates a flowchart of a process for managing an Internet Protocol Security (IPsec) tunnel according to an implementation described herein.

FIG. 7 illustrates a flowchart of a process for managing an IPsec tunnel according to an implementation described herein. In some implementations, process 700 of FIG. 7 may be performed by N3IWF 274. In other implementations, some or all of process 700 may be performed by another device or a group of devices separate from N3IWF 274.

As shown in FIG. 7, process 700 may include establishing an IPsec tunnel from a UE device to a core network via a WiFi connection (block 710) and providing location update information associated with the UE device to a UDM function (block 720). For example, UE device 110 may connect to WiFi AP 120 and attach to core network 140 via N3IWF 274 and set up an IPsec tunnel to N3IWF 274 via WiFi AP 120. UE device 110 may then send location update information to N3IWF 274 using the established IPsec tunnel and N3IWF 274 may forward the location update information to UDM 252. The location information may include a UE device ID, a GUAMI for AMF 220 associated with UE device 110, an N3IWF ID associated with N3IWF 274, a WiFi AP MAC address, and/or another type of device identifier, associated with WiFi AP 120, an SSID for the WiFi network associated with WiFi AP 120, and/or other types of location update information.

Process 700 may further include detecting that the IPsec tunnel has become idle (block 730) and instructing the UE device to tear down the IPsec tunnel in response (block 740). For example, N3IWF 274 may determine that the IPsec tunnel has satisfied an idleness criterion. Determining that the idleness criterion has been satisfied may include determining that less than a threshold amount of data has been sent or received via the IPsec tunnel within a particular time period. As an example, N3IWF 274 may determine that the number of bytes sent and/or received via the IPsec tunnel within a time period (e.g., a minute, etc.) is less than a threshold number of bytes. As another example, N3IWF 274 may determine that no application level data has been sent or received via the IPsec tunnel within the time period. As yet another example, N3IWF 274 may determine that only keep-alive packets have been sent and/or received via the IPsec tunnel within the time period.

In response to detecting that the IPsec tunnel has become idle, N3IWF 274 may instruct UE device 110 to tear down the IPsec tunnel and, in response, UE device 110 may tear down the IPsec tunnel and N3IWF 274 may release the resources (e.g., network bandwidth, processor and memory resources, etc.) used to maintain the IPsec tunnel. As an example, N3IWF 274 may instruct UE device 110 to discard the security association information associated with the IPsec tunnel, such as the keys exchanged by UE device 110 an N3IWF 274. Additionally, or alternatively, N3IWF 274 may instruct UE device 110 to stop sending keep-alive packets via the IPsec tunnel, may cease to recognize and/or respond to keep-alive packets received via the IPsec tunnel from UE device 110, and/or may cease to send keep-alive packets to UE device 110 via the IPsec tunnel. N3IWF 274 may then release resources associated with maintaining the IPsec tunnel.

Process 700 may further include receiving a mobile terminating call for the UE device (block 750) and paging the UE device to establish a new IPsec tunnel (block 760). For example, N3IWF 274 may receive an IMS session creation request from AMF 220 for UE device 110 based on a mobile terminating call received for UE device 110 from an IMS system. In response, N3IWF 274 may send a paging message to UE device 110 to establish a new IPsec tunnel to N3IWF 274 via WiFi AP 120.

A new IPsec tunnel may be established with the UE device via the WiFi connection (block 770) and the mobile terminating call may be forwarded to the UE device using the established new IPsec tunnel (block 780). For example, in response to receiving the paging message from N3IWF 274, UE device 110 may set up a new IPsec tunnel to N3IWF 274 via WiFi AP 120. N3IWF 274 may further set up an IPsec tunnel to UPF 230 which functions as a gateway and/or APN for PDN 170 associated with the IMS from which the mobile terminating call has been received.

In some implementations, if paging UE device 110 via the WiFi connection is not successful, the N3IWF may inform AMF 220 that UE device 110 did not respond to the paging message and/or that UE device 110 cannot be reached. In response, AMF 220 may page UE device 110 via a cellular connection using base station 155 to which UE device 110 is attached. In other implementations, core network 140 may page UE device 110 via both the WiFi connection using N3IWF 274 and via the cellular connection using AMF 220 and base station 155. If paging UE device 110 is not successful (e.g., the UE device does not respond by establishing an IPsec tunnel) as a result of paging UE device 110 using the WiFi connection and/or as a result of paging UE device 110 using a cellular connection via base station 155, the mobile terminating call may be forwarded to voicemail. For example, AMF 220 may instruct UPF 230 to route the mobile terminating call to a voicemail function that maintains a voicemail inbox for UE device 110.

Figure 8:
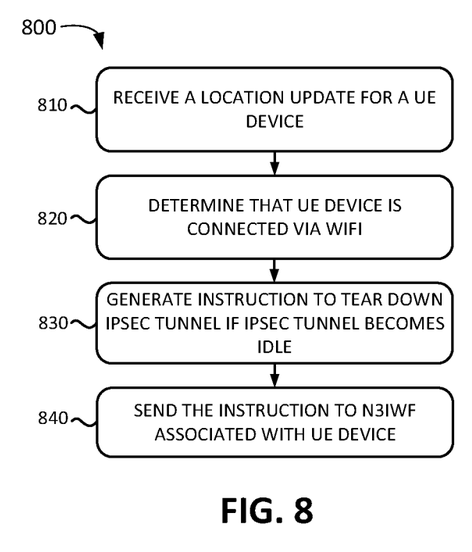
FIG. 8 illustrates a flowchart of a process for managing location updates according to an implementation described herein.

FIG. 8 illustrates a flowchart of a process for managing location updates according to an implementation described herein. In some implementations, process 800 of FIG. 8 may be performed by UDM 252. In other implementations, some or all of process 800 may be performed by another device or a group of devices separate from UDM 252.

As shown in FIG. 8, process 800 may include receiving a location update for a UE device (block 810). For example, UDM 252 may receive a location update from UE device 110 that includes a UE device ID, a GUAMI for AMF 220 associated with UE device 110, an N3IWF ID for N3IWF 274 associated with UE device 110, a WiFi AP MAC address, and/or another type of device identifier, for WiFi AP 120 associated with UE device 110, an SSID for the WiFi network associated with UE device 110, and/or other types of location update information.

Process 800 may further include determining that UE device 110 is connected via WiFi (block 820), generating an instruction to tear down the IPsec tunnel associated with UE device 110 if the IPsec tunnel becomes idle (block 830), and sending the instruction o N3IWF 274 associated with UE device 110 (block 840). For example, UDM 252 may determine, based on the N3IWF ID included in the location update, that UE device 110 is attached to core network 140 via N3IWF 274 and thus is using a WiFi connection. In response, UDM 252 may instruct N3IWF 274 to tear down the IPsec tunnel associated with UE device 110 if the IPsec tunnel becomes idle.

Figure 9A:
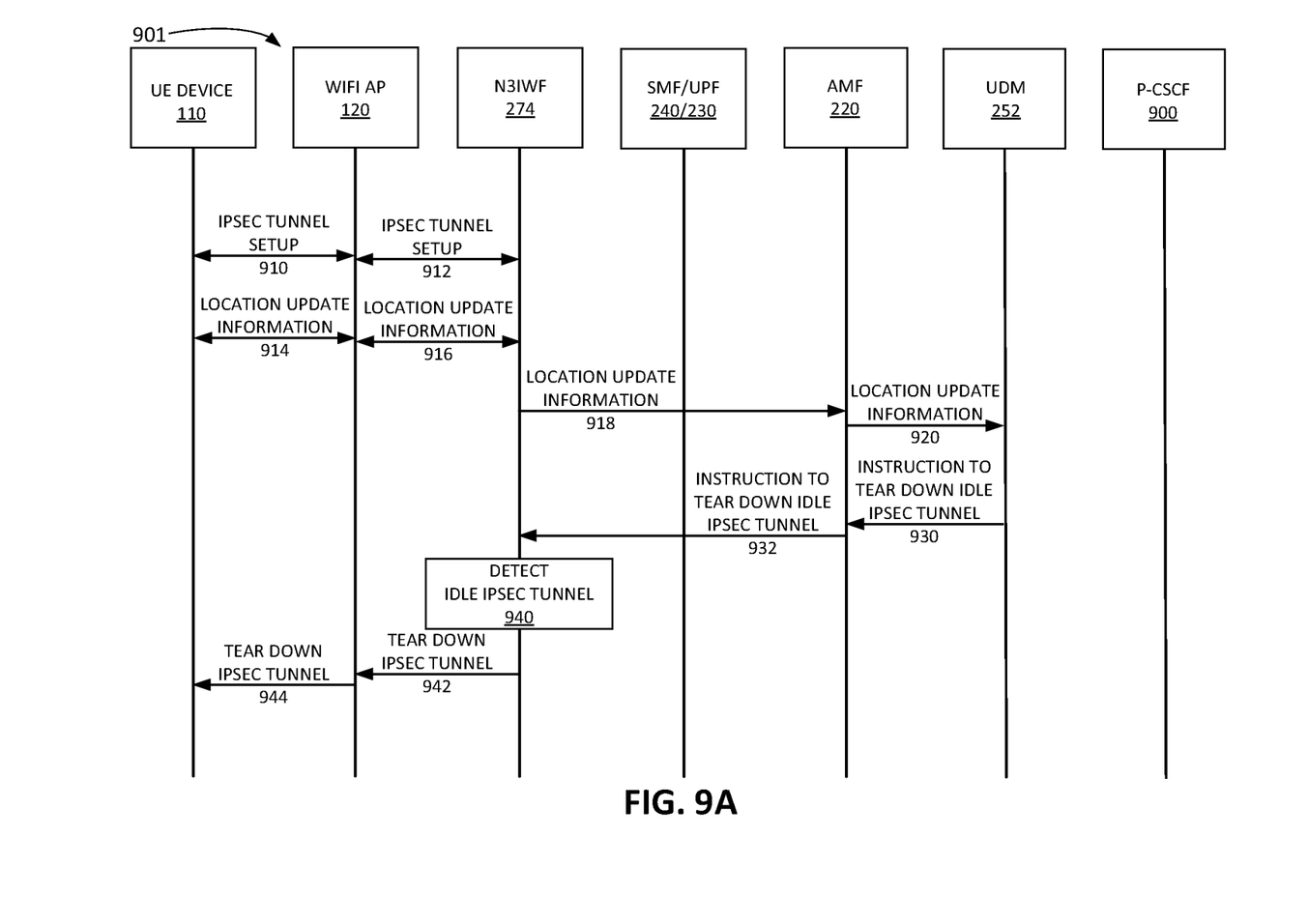
FIGS. 9A and 9B illustrate exemplary signal flows according to an implementation described herein.

FIG. 9A illustrates a first exemplary signal flow 901 according to an implementation described herein. Signal flow 901 may include UE device 110 connecting to WiFi AP 120 and attaching to core network 140 via N3IWF 274 and UE device 110 setting up an IPsec tunnel to N3IWF 274 via WiFi AP 120 (signals 910 and 912). UE device 110 may then send location update information to UDM 252 via N3IWF 274 using the established IPsec tunnel and N3IWF 274 may forward the location update information to UDM 252 via AMF 220 (signals 914, 916, 918, and 920). The location information may include a UE device ID, a GUAMI for AMF 220 associated with UE device 110, an N3IWF ID associated with N3IWF 274, a WiFi AP MAC address, and/or another type of device identifier, associated with WiFi AP 120, an SSID for the WiFi network associated with WiFi AP 120, and/or other types of location update information. The location update information may be stored by UDM 252 in a UE device record 600 associated with UE device 110.

UDM 252 may send an instruction to N3IWF 274 to tear down the IPsec tunnel if the IPsec tunnel becomes idle, in order to conserve network resources (signals 930 and 932). At a later time, N3IWF 274 may detect that the IPsec tunnel has become idle (block 940). For example, N3IWF 274 may determine that less than a threshold amount of data has been sent or received via the IPsec tunnel within a particular time period. In response to detecting that the IPsec tunnel has become idle, N3IWF 274 may instruct UE device 110 to tear down the IPsec tunnel (signals 942 and 944). In response, UE device 110 may tear down the IPsec tunnel and N3IWF 274 may release the resources (e.g., network bandwidth, processor and memory resources, etc.) used to maintain the IPsec tunnel. The signal flow may continue as shown in FIG. 9B.

Figure 9B:
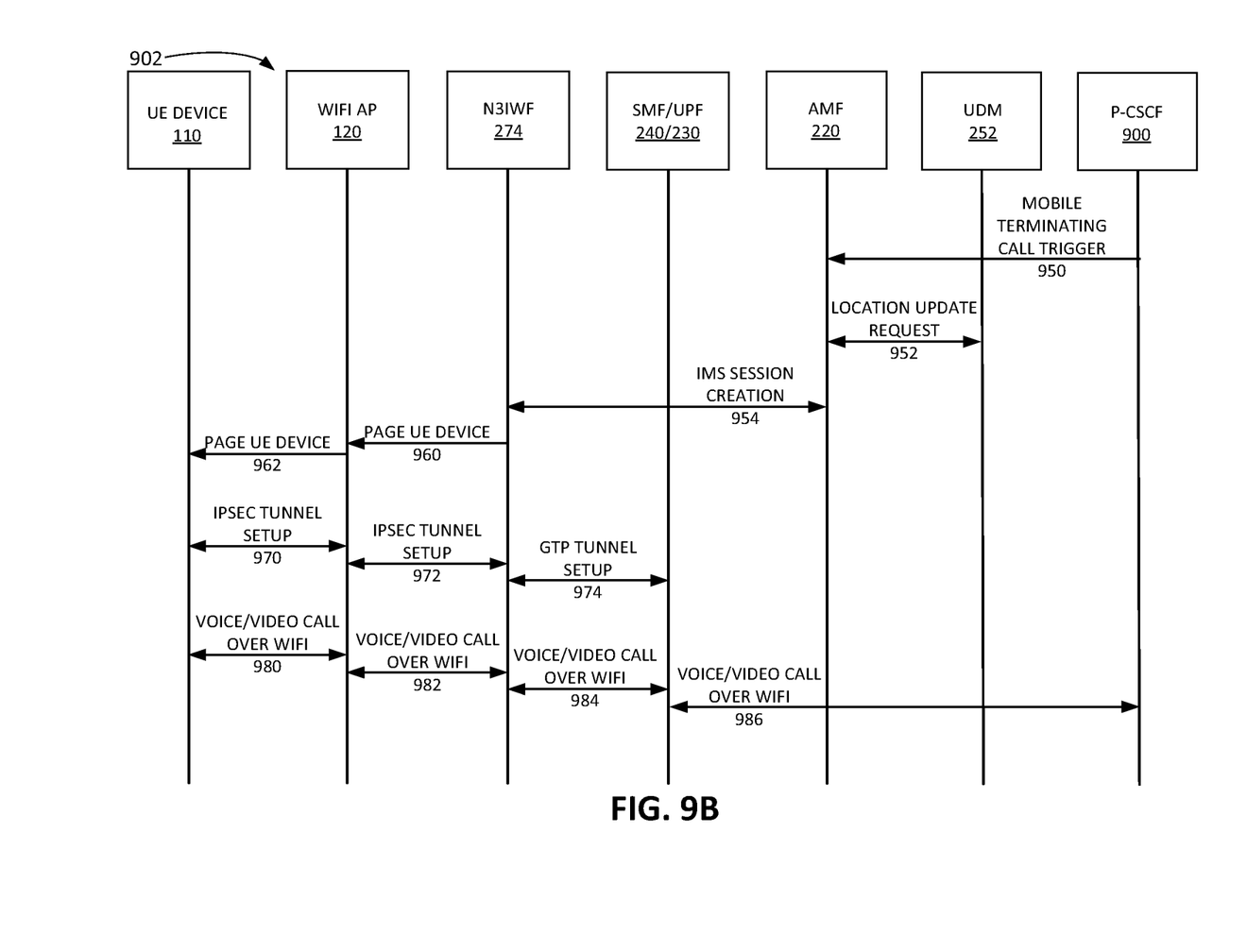

FIG. 9B illustrates a first exemplary signal flow 902 according to an implementation described herein. As shown in FIG. 9B, signal flow 902 may include a mobile terminating call being received by AMF 220 from a Proxy Call Session Control Function (P-CSCF) 900 of an IMS network (signal 950). In response, AMF 220 may send a location update request to UDM 252 for UE device 110 and UDM 252 may provide a location update for UE device 110 to AMF 252 (block 952). The location update for UE device 110 may indicate that UE device 110 is attached to core network 140 via N3IWF 274 and WiFi AP 120 and, therefore, AMF 220 may initiate an IMS session creation process with N3IWF 274 for UE device 110 (signal 954).

N3IWF 274 may receive an IMS session creation request from AMF 220 for UE device 110 and may, in response, page UE device 110 via WiFi AP 120 to create a new IPsec tunnel (signals 960 and 962). In response to receiving the paging message from N3IWF 274, UE device 110 may set up a new IPsec tunnel to N3IWF 274 via WiFi AP 120 (signals 970 and 972). N3IWF 274 may set up a GPRS Tunneling Protocol (GTP) tunnel to UPF 230 via SMF 240 (signal 974). UPF 230 may function as a gateway to a IMS network that incudes P-CSCF 900 handling the mobile terminating call. After the IPsec tunnel is established, UE device 110 may receive the mobile terminating call and may send and/or receive data associated with the voice and/or video call over the established IPsec tunnel (signals 980, 982, 984, and 986).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals have been described with respect to FIGS. 9A and 9B, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    detecting, by a computer device, that an Internet Protocol Security (IPsec) tunnel from a user equipment (UE) device connected via a WiFi connection has become idle;
    instructing, by the computer device, the UE device to tear down the IPsec tunnel, in response to detecting that the IPsec tunnel has become idle;
    receiving, by the computer device, a mobile terminating call for the UE device;
    paging, by the computer device, the UE device via a base station to reestablish the IPsec tunnel via the WiFi connection, in response to receiving the mobile terminating call for the UE device, wherein the paging is performed using information from a location update received from the UE device via the IPsec tunnel; and
    forwarding, by the computer device, the received mobile terminating call to the UE device via the reestablished IPsec tunnel.

2. The method of claim 1, further comprising:
    receiving location update information from the UE device via the reestablished IPsec tunnel; and
    providing the received location update information to a Unified Data Management (UDM) function.

3. The method of claim 2, wherein the location update information includes at least one of:
    a Globally Unique Access and Mobility Function Identifier (GUAMI) associated with the UE device;
    a Non-Third-Generation-Partnership-Project Interworking Function (N3IWF) identifier associated with the UE device;
    a WiFi Access Point (AP) Media Access Control (MAC) address associated with the WiFi connection; or
    a service set identifier (SSID) associated with the WiFi connection.

4. The method of claim 1, wherein the computer device includes a Non-Third-Generation-Partnership-Project Interworking Function (N3IWF).

5. The method of claim 1, further comprising:
    receiving an instruction from a Unified Data Management (UDM) function to tear down the IPsec tunnel if the IPsec tunnel becomes idle.

6. The method of claim 1, further comprising:
    detecting that another IPsec tunnel from another UE device connected via another WiFi connection has become idle;
    instructing the other UE device to tear down the other IPsec tunnel, in response to detecting that the other IPsec tunnel from the other UE device connected via the other WiFi connection has become idle;
receiving another mobile terminating call for the other UE device; and
paging the other UE device via the other WiFi connection to reestablish the other IPsec tunnel.

7. The method of claim 1, further comprising:
detecting that another IPsec tunnel from another UE device connected via another WiFi connection has become idle;
instructing the other UE device to tear down the other IPsec tunnel, in response to detecting that the other IPsec tunnel from the other UE device connected via the other WiFi connection has become idle;
receiving another mobile terminating call for the other UE device;
sending a paging message to the other UE device via the other WiFi connection to reestablish the other IPsec tunnel, in response to receiving the other mobile terminating call for the other UE device;
determining that the other UE device has not responded to the paging message; and
forwarding the other mobile terminating call to voicemail, in response to determining that the other UE device has not responded to the paging message.

8. A device comprising:
a memory storing instructions; and
a processor configured to execute the instructions to:
detect that an Internet Protocol Security (IPsec) tunnel from a user equipment (UE) device connected via a WiFi connection has become idle;
instruct the UE device to tear down the IPsec tunnel, in response to detecting that the IPsec tunnel has become idle;
receive a mobile terminating call for the UE device;
page the UE device via a base station to reestablish the IPsec tunnel via the WiFi connection, in response to receiving the mobile terminating call for the UE device, wherein the paging is performed using information from a location update received from the UE device via the IPsec tunnel; and
forward the received mobile terminating call to the UE device via the reestablished IPsec tunnel.

9. The device of claim 8, wherein the processor is further configured to:
receive location update information from the UE device via the reestablished IPsec tunnel; and
provide the received location update information to a Unified Data Management (UDM) function.

10. The device of claim 9, wherein the location update information includes at least one of:
a Globally Unique Access and Mobility Function Identifier (GUAMI) associated with the UE device;
a Non-Third-Generation-Partnership-Project Interworking Function (N3IWF) identifier associated with the UE device;
a WiFi Access Point (AP) Media Access Control (MAC) address associated with the WiFi connection; or
a service set identifier (SSID) associated with the WiFi connection.

11. The device of claim 8, wherein the device includes a Non-Third-Generation-Partnership-Project Interworking Function (N3IWF).

12. The device of claim 8, wherein the processor is further configured to:
receive an instruction from a Unified Data Management (UDM) function to tear down the IPsec tunnel if the IPsec tunnel becomes idle.

13. The device of claim 8, wherein the processor is further configured to:
detect that another IPsec tunnel from another UE device connected via another WiFi connection has become idle;
instruct the other UE device to tear down the other IPsec tunnel, in response to detecting that the other IPsec tunnel from the other UE device connected via the other WiFi connection has become idle;
receive an other mobile terminating call for the other UE device; and
page the other UE device via the other WiFi connection to reestablish the other IPsec tunnel.

14. The device of claim 8, wherein the processor is further configured to:
detect that another IPsec tunnel from another UE device connected via another WiFi connection has become idle;
instruct the other UE device to tear down the other IPsec tunnel, in response to detecting that the other IPsec tunnel from the other UE device connected via the other WiFi connection has become idle;
receive an other mobile terminating call for the other UE device;
send a paging message to the other UE device via the other WiFi connection to reestablish the other IPsec tunnel, in response to receiving the other mobile terminating call for the other UE device;
determine that the other UE device has not responded to the paging message; and
forward the other mobile terminating call to voicemail, in response to determining that the other UE device has not responded to the paging message.

15. A system comprising:
a first device configured to:
implement a Unified Data Management (UDM) that stores information associated with user equipment (UE) devices; and
a second device configured to:
receive an instruction from the first device to tear down an Internet Protocol Security (IPsec) tunnel from a UE device connected via a WiFi connection when the IPsec tunnel has become idle;
detect that the IPsec tunnel from the UE device connected via the WiFi connection has become idle;
instruct the UE device to tear down the IPsec tunnel, in response to detecting that the IPsec tunnel has become idle;
receive a mobile terminating call for the UE device;
page the UE device via a base station to reestablish the IPsec tunnel via the WiFi connection, in response to receiving the mobile terminating call for the UE device, wherein the paging is performed using information from a location update received from the UE device via the IPsec tunnel; and
forward the received mobile terminating call to the UE device via the reestablished IPsec tunnel.

16. The system of claim 15, wherein the second device is further configured to:
receive location update information from the UE device via the reestablished IPsec tunnel; and
provide the received location update information to the first device.

17. The system of claim 16, wherein the location update information includes at least one of:
- a Globally Unique Access and Mobility Function Identifier (GUAMI) associated with the UE device;
- a Non-Third-Generation-Partnership-Project Interworking Function (N3IWF) identifier associated with the UE device;
- a WiFi Access Point (AP) Media Access Control (MAC) address associated with the WiFi connection; or
- a service set identifier (SSID) associated with the WiFi connection.

18. The system of claim 15, wherein the second device includes a Non-Third-Generation-Partnership-Project Interworking Function (N3IWF).

19. The system of claim 15, wherein the second device is further configured to:
- detect that another IPsec tunnel from another UE device connected via another WiFi connection has become idle;
- instruct the other UE device to tear down the other IPsec tunnel, in response to detecting that the other IPsec tunnel from the other UE device connected via the other WiFi connection has become idle;
- receive an other mobile terminating call for the other UE device; and
- page the other UE device via the other WiFi connection to reestablish the other IPsec tunnel.

20. The system of claim 15, wherein the second device is further configured to:
- detect that another IPsec tunnel from another UE device connected via another WiFi connection has become idle;
- instruct the other UE device to tear down the other IPsec tunnel, in response to detecting that the other IPsec tunnel from the other UE device connected via the other WiFi connection has become idle;
- receive another mobile terminating call for the other UE device;
- send a paging message to the other UE device via the other WiFi connection to reestablish the other IPsec tunnel, in response to receiving the other mobile terminating call for the other UE device;
- determine that the other UE device has not responded to the paging message; and
- forward the other mobile terminating call to voicemail, in response to determining that the other UE device has not responded to the paging message.

* * * * *